United States Patent
Lunn et al.

(10) Patent No.: US 8,104,988 B2
(45) Date of Patent: Jan. 31, 2012

(54) LOCKING CONNECTOR SYSTEM

(75) Inventors: Jason Lunn, Cooks Hill (AU); Matthew Patton, Bolwarra Heights (AU); Reece Attwood, Fishing Point (AU)

(73) Assignee: Bradken Resources Pty Limited, Mayfield West, New South Wales (AU)

(*) Notice: Subject to any disclaimer, the term of this patent is extended or adjusted under 35 U.S.C. 154(b) by 427 days.

(21) Appl. No.: 12/302,761

(22) PCT Filed: May 28, 2007

(86) PCT No.: PCT/AU2007/000738
§ 371 (c)(1),
(2), (4) Date: Nov. 26, 2008

(87) PCT Pub. No.: WO2007/137344
PCT Pub. Date: Dec. 6, 2007

(65) Prior Publication Data
US 2009/0196683 A1    Aug. 6, 2009

(30) Foreign Application Priority Data
May 29, 2006  (AU) ................................ 2006902887

(51) Int. Cl.
*F16B 21/16* (2006.01)
(52) U.S. Cl. ........................................ 403/154; 403/317
(58) Field of Classification Search .................. 403/151, 403/154, 155, 316–319, 327, 349.2, 359.5, 403/359.2; 59/86
See application file for complete search history.

(56) References Cited

U.S. PATENT DOCUMENTS

| 520,110 | A | * | 5/1894 | Hull .................................. 278/96 |
| 1,646,546 | A | * | 10/1927 | Larsen ................................ 59/86 |
| 2,124,912 | A | * | 7/1938 | Ehmann ............................ 59/86 |
| 2,369,344 | A | * | 2/1945 | Ehmann ............................ 59/86 |
| 4,102,124 | A | * | 7/1978 | Swager ............................. 59/86 |
| 4,221,252 | A | * | 9/1980 | Bruce ............................ 411/317 |
| 4,337,614 | A | * | 7/1982 | Briscoe ............................. 59/86 |
| 4,555,125 | A | | 11/1985 | Goodlove |
| 4,951,550 | A | * | 8/1990 | Ohki et al. .................... 91/369.3 |
| 5,046,881 | A | * | 9/1991 | Swager .......................... 403/154 |
| 5,114,260 | A | | 5/1992 | Hart et al. |
| 5,272,824 | A | | 12/1993 | Cornelius |

(Continued)

*Primary Examiner* — Joshua Kennedy
(74) *Attorney, Agent, or Firm* — Kenyon & Kenyon LLP

(57) ABSTRACT

Components for use in a locking connector system, such a heavy duty shackles, comprise a retainer, a body structure and pin which is axially moveable into a receiving cavity of the body structure, the body structure having a transversely directed cavity interconnecting with the cavity and have a latching shoulder. The retainer has a body, a latch element associated with the body and adapted to move into a space adjacent the latching shoulder of the aperture when the retainer is inserted into the transverse aperture to retain the retainer in its aperture and the body of the retainer having a projecting portion for location adjacent the surface portion of the pin for restraining the pin from removal when the retainer is inserted, the retainer further having a latch actuator which is displaceable in the body from a released position to an engaged position for moving the latch element from its retracted position to a latching position, and the latch actuator further having releasable retention means for retaining the latch actuator in the engaged position but, on application of a retraction force, adapted to release the latch actuator to permit its return to its retracted position, thereby allowing return of the latch element to its retracted position, whereby the retainer may be removed from the aperture and the pin removed from the cavity.

14 Claims, 11 Drawing Sheets

U.S. PATENT DOCUMENTS

| | | | | |
|---|---|---|---|---|
| 5,367,798 A | * | 11/1994 | Hughes | 37/399 |
| 5,423,138 A | | 6/1995 | Livesay et al. | |
| 5,791,809 A | | 8/1998 | Bessey | |
| 5,913,605 A | * | 6/1999 | Jusselin et al. | 37/451 |
| 6,023,927 A | * | 2/2000 | Epstein | 59/86 |
| 6,158,917 A | * | 12/2000 | Wolin et al. | 403/319 |
| 7,393,033 B1 | * | 7/2008 | Bisso, IV | 294/82.1 |
| 7,654,594 B2 | * | 2/2010 | Bisso, IV | 294/82.35 |

\* cited by examiner

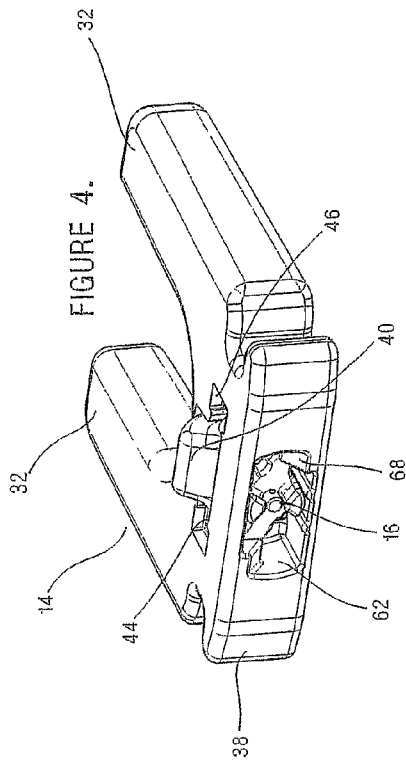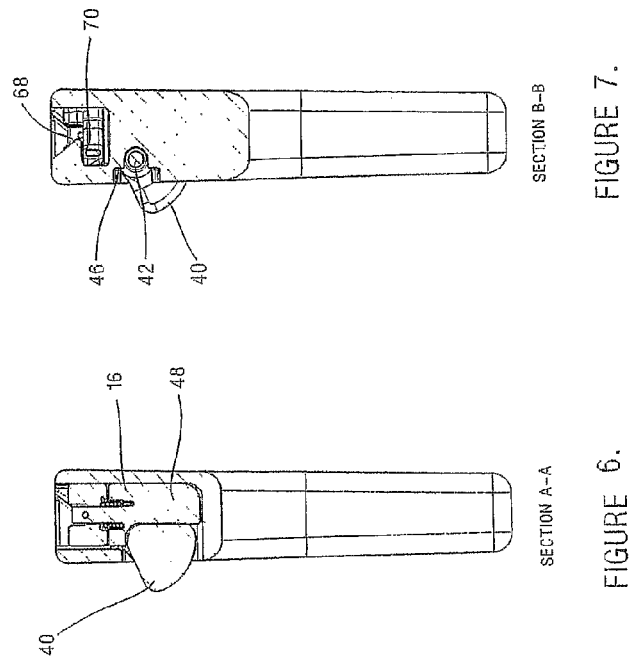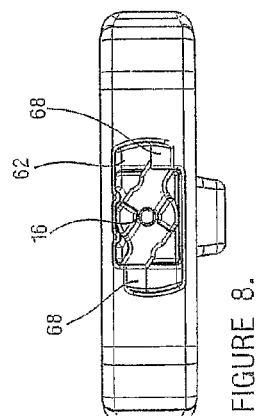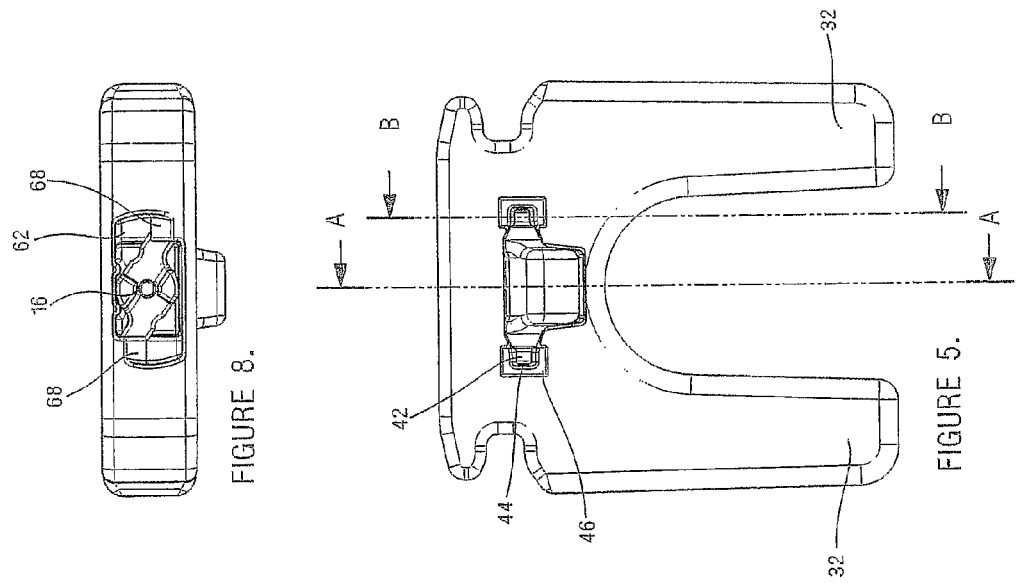

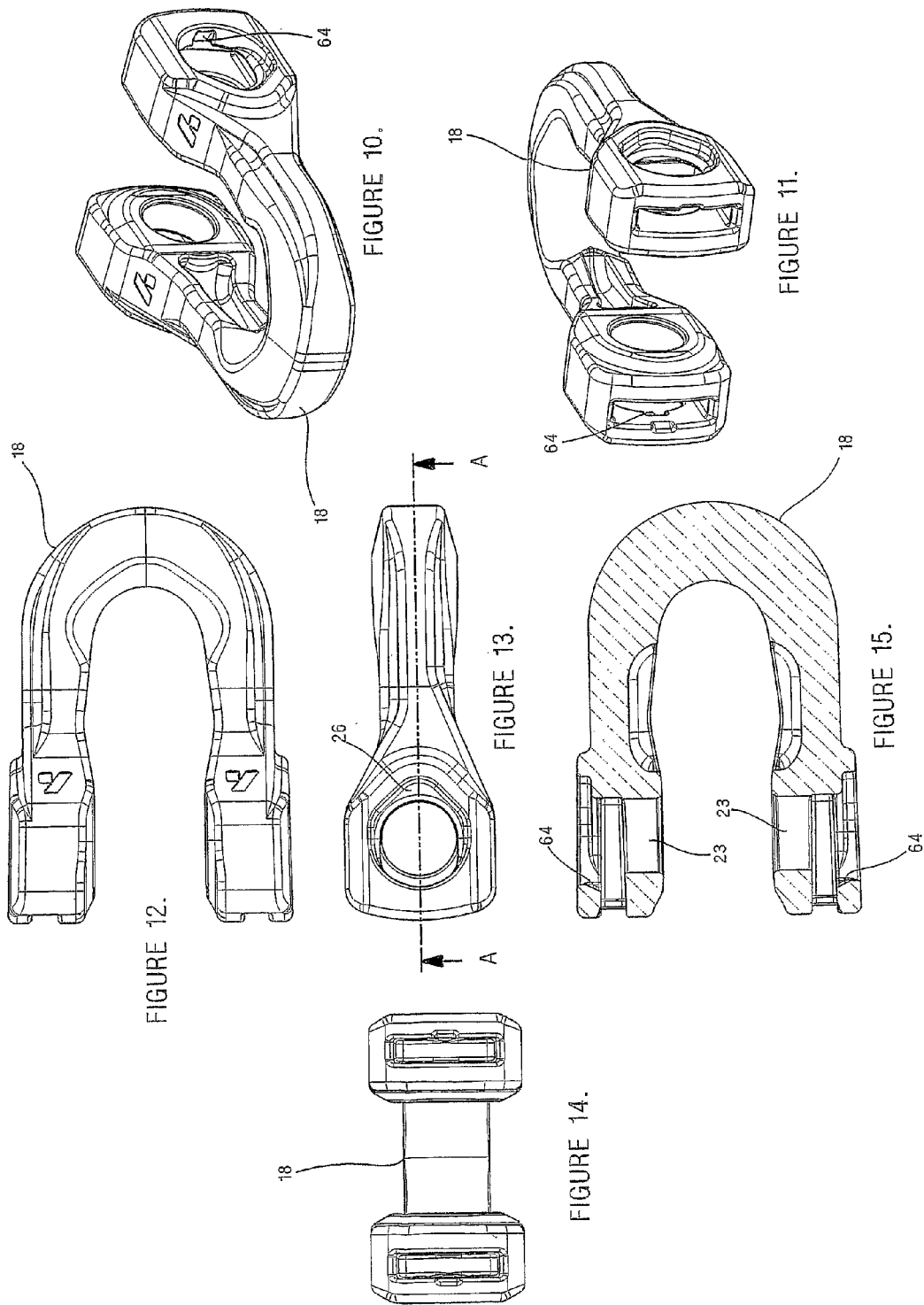

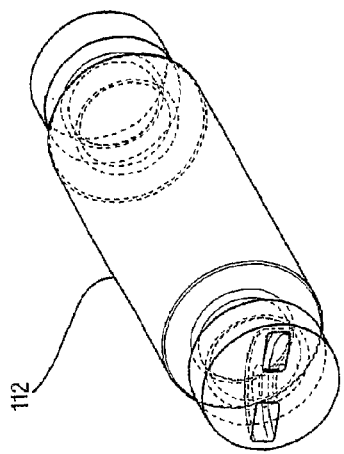
FIGURE 21.
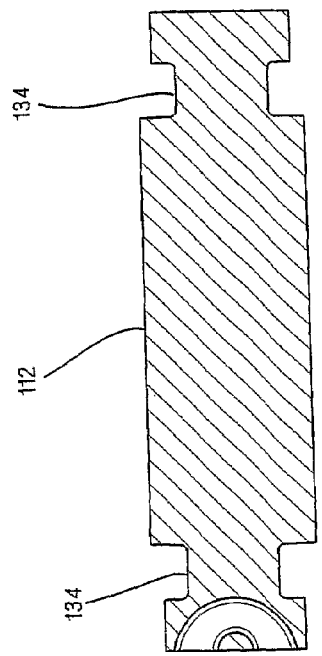
SECTION B-B
FIGURE 23.
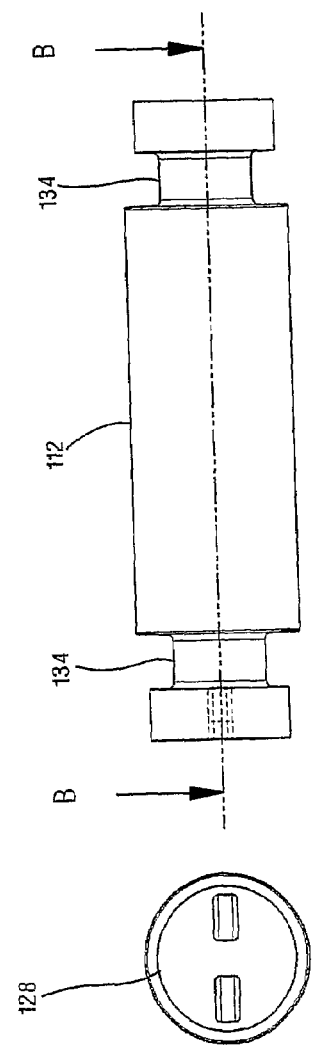
FIGURE 22.
FIGURE 24.
FIGURE 25

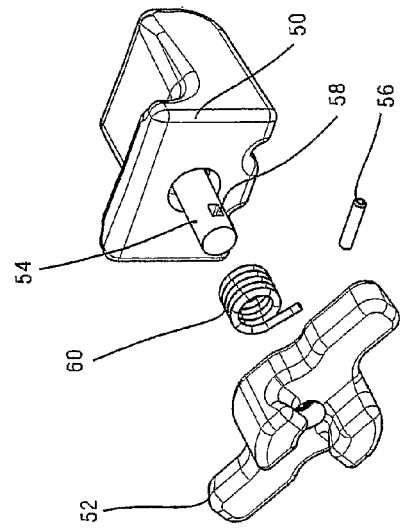
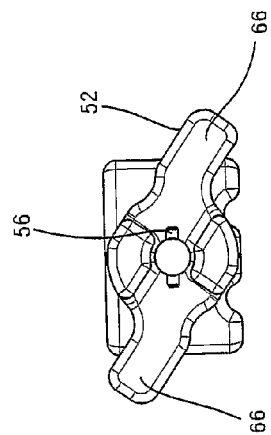
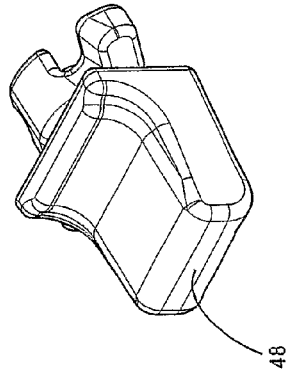
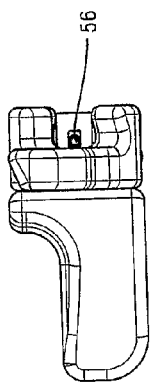
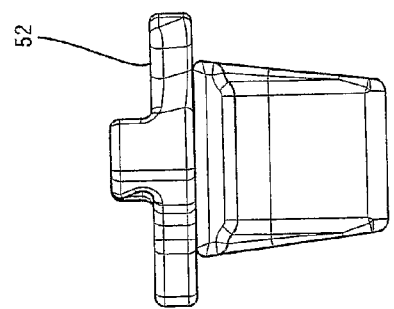
FIGURE 26.
FIGURE 27.
FIGURE 28.
FIGURE 29.
FIGURE 30.
FIGURE 31.

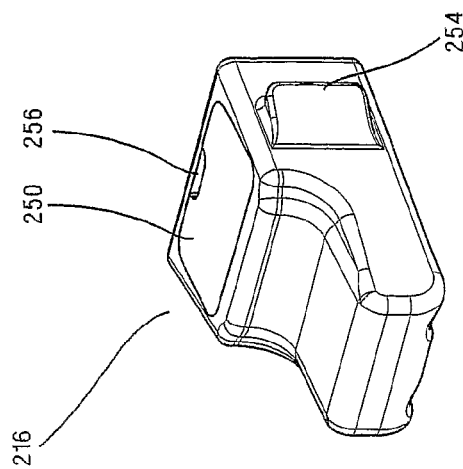
FIGURE 47.
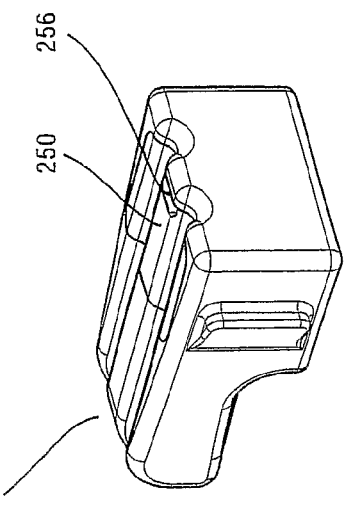
FIGURE 48.
FIGURE 44.
FIGURE 45.
FIGURE 46.

LOCKING CONNECTOR SYSTEM

This is a 371 national phase application of PCT/AU2007/000738 filed 28 May 2007, claiming priority to Australian Patent Application No. 2006902887 filed 29 May 2006, the contents of which are incorporated herein by reference.

BACKGROUND OF THE INVENTION

The present invention relates to components for use in a locking connector system and is particularly applicable to the field of heavy duty shackles for use with large scale excavation and mining equipment but the invention also extends to arrangements for other applications.

Particularly for excavation equipment and large scale mining operations, large heavy duty shackles are secured with a shackle pin to connect components for example in a drag line. It is important that the shackle is securely locked in position and remains so during a period of robust service and when exposed to harsh conditions including vibration, impact, corrosion and abrasion. After a period of service components must be replaced and in a mine location there is a need to make such replacement with minimum downtime of the expensive equipment and with ease, speed and safety.

BRIEF SUMMARY OF THE INVENTION

In one aspect the invention consists in a retainer for retaining an elongate, load-carrying pin in a structure, the pin being adapted to be axially moved into a receiving cavity in the structure, the structure having a transversely directed aperture interconnecting with the cavity and having a latching shoulder, the pin having a surface element in relation to which the retainer, when inserted into the aperture, is positioned to restrain axial movement of the pin in a removal direction from the cavity, the retainer having a body, a latch element associated with the body and adapted to move into a space adjacent the latching shoulder of the aperture when the retainer is inserted into the transverse aperture to retain the retainer in its aperture and the body of the retainer having a projecting portion for location adjacent the surface portion of the pin for restraining the pin from removal when the retainer is inserted, the retainer further having a latch actuator which is displaceable in the body from a released position to an engaged position for moving the latch element from its retracted position to a latching position, and the latch actuator further having releasable retention means for retaining the latch actuator in the engaged position but, on application of a retraction force, adapted to release the latch actuator to permit its return to its retracted position, thereby allowing return of the latch element to its retracted position, whereby the retainer may be removed from the aperture and the pin removed from the cavity.

In a second aspect the invention consists in a structure for use with the above described retainer.

A third aspect of the invention consists in a pin for use in the body structure and retainer described above.

In a fourth aspect the invention consists in a combination of the retainer, the body structure and pin.

One particular application is to securing a pin in a shackle, the pin being axially displaceable through aligned apertures in the end region of the legs of the shackle. The pin may have a non-circular head portion adapted to fit in a complementary rebate in the external face of the shackle leg whereby the pin is restrained from rotation. Furthermore, the pin can have a reduced diameter portion providing the surface element for retainer engagement in the form of shoulder transverse to the axis of the pin and for engaging with the locking retainer. The latch element of the retainer can be pivotally mounted in the retainer for engaging the latching shoulder in the structure when in the locking or latching position.

The retainer may have the latch element in the form of a wedge shaped element of part cylindrical form having a laterally extending pivot portions adapted to be received in a corresponding support in the retainer.

The arrangement may be generally symmetrical with the shackle having transverse cavities extending into the end portions of each leg and each adapted to receive a similar retainer. In practice two retainers can be used for security, one in each shackle leg. Similarly the end portions of the shackle legs can be symmetrical, with each having a rebate for receiving the head of the pin which may be of a non-rotational design.

BRIEF DESCRIPTION OF THE DRAWINGS

For many applications a non-rotating pin may be preferred but the invention extends to embodiments in which the pin is free to rotate.

Embodiments of the invention will now be described with reference to the accompanying drawings of which:—

FIG. 4 is a perspective view of the locking unit;

FIG. 5 is a plan view of the locking unit;

FIG. 6 is a sectional elevation taken along the line of A-A of FIG. 5;

FIG. 7 is a sectional elevation taken along the line of B-B of FIG. 5;

FIG. 8 is an end view of the locking units;

FIG. 10 is a perspective view of the shackle from the top end;

FIG. 11 is a perspective view of the shackle from the bottom end;

FIG. 12 is a plan view of the shackle;

FIG. 13 is a side view of the shackle;

FIG. 14 is an end view of the shackle;

FIG. 15 is a section along the line A-A of FIG. 13;

FIG. 21 is a perspective view of a second embodiment of shackle pin which may be used in the arrangement of FIG. 1 and of a rotatable form;

FIG. 22 is a front view of the shackle pin of FIG. 21;

FIG. 23 is a plan sectional view of the shackle pin taken along the line B-B;

FIG. 24 is a right hand end view of the shackle pin of FIG. 21;

FIG. 25 is a left hand end view of the shackle pin of FIG. 21;

FIG. 26 is a perspective disassembled view of the actuator for the locking device of FIGS. 4 to 8;

FIG. 27 is a view of the device of FIG. 26 assembled in perspective view;

FIG. 28 is a front elevation of the device of FIG. 27;

FIG. 29 is right hand end view with the device of FIG. 27;

FIG. 30 is a left hand end view with the device of FIG. 27;

FIG. 31 is a plan view of the device of FIG. 27;

FIG. 44 is a plan view of a further alternative latch actuator;

FIG. 45 is a side view of the latch actuator of FIG. 44;

FIG. 46 is a front view of the latch actuator of FIG. 44;

FIG. 47 is a perspective view of the latch actuator of FIG. 44; and

FIG. 48 is a rear perspective view of the latch actuator of FIG. 44.

DETAILED DESCRIPTION OF EMBODIMENTS

Figures 1, 2:
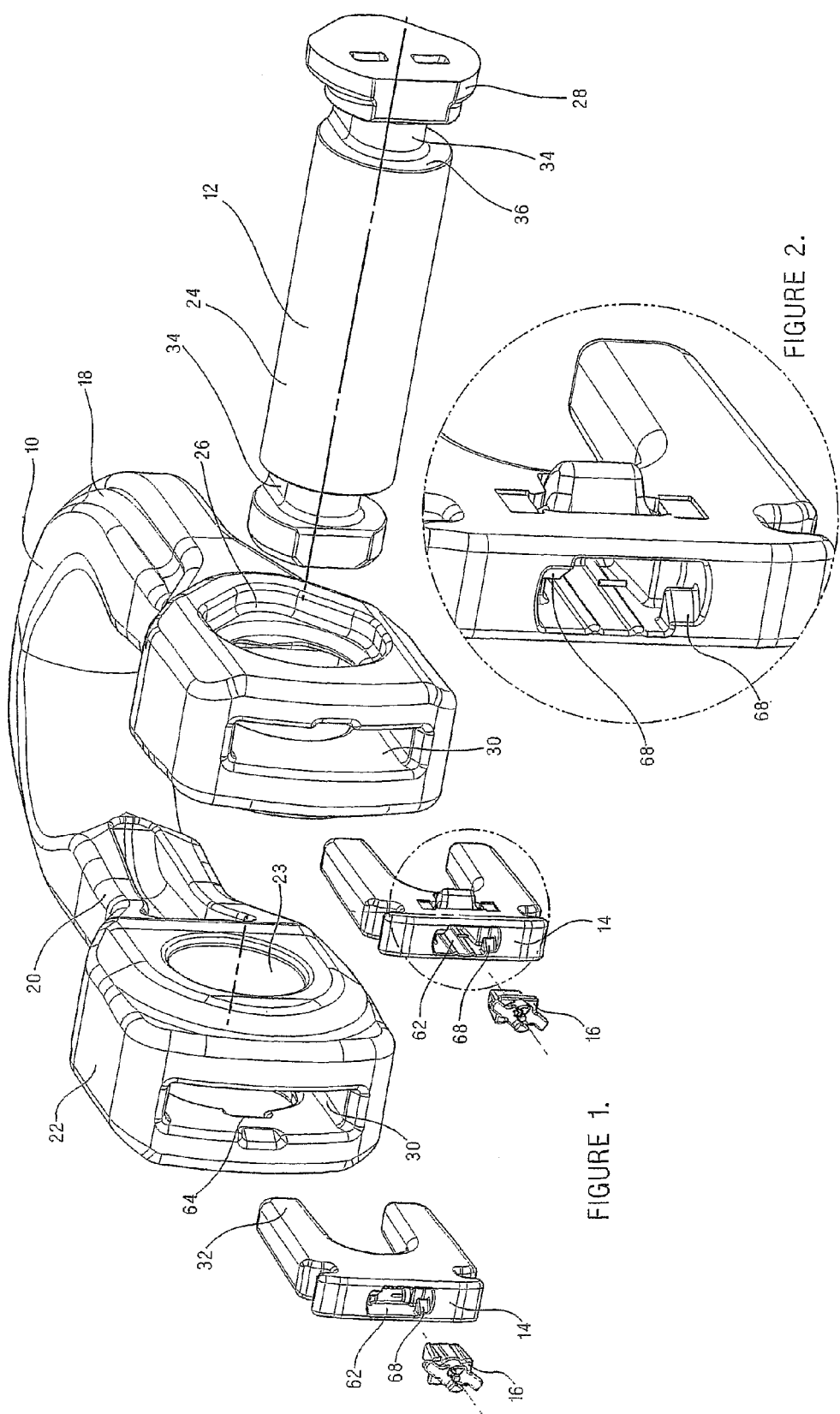
FIG. 1 is an exploded view of an embodiment comprising a shackle, a shackle pin and two locking units for retaining the shackle pin.
FIG. 2 is a view on an enlarged scale of a portion of one of the ensemble assembly locking elements.

FIG. 1 shows a shackle system comprising a structure in the form of generally U-shaped shackle 10, a load-carrying pin in the form of shackle pin 12 and two retainers in the form of latch retainer units 14 having respective latch actuators 16. The shackle 10 has a U-shaped body 18 having legs 20 of similar form ending in respective feet 22 through which transversely extend bores 23 of circular cross section which together form a cavity into which the shaft 24 of shackle pin 12 is axially slideable. The outer face of each leg 22 has a rebate 26 profiled to accommodate the non-circular head 28 of the pin 12 to prevent its rotation. The feet 22 are identically rebated so the shackle pin can be inserted from either side of the shackle.

Each of the feet 22 also has a rectangular cross section lateral aperture 30 for receiving a respective retainer latch 14. As all will be described more detailed below, the retainer latch 14 has projecting portions in the form of legs 32 which engage in a clearance over a reduced diameter neck 34 on the shackle pin 12 so that when the latch retainer is in position the shoulders 36 on the pin 12 would engage against a leg 32 to prevent removal of the pin should it move axially.

Figure 3:
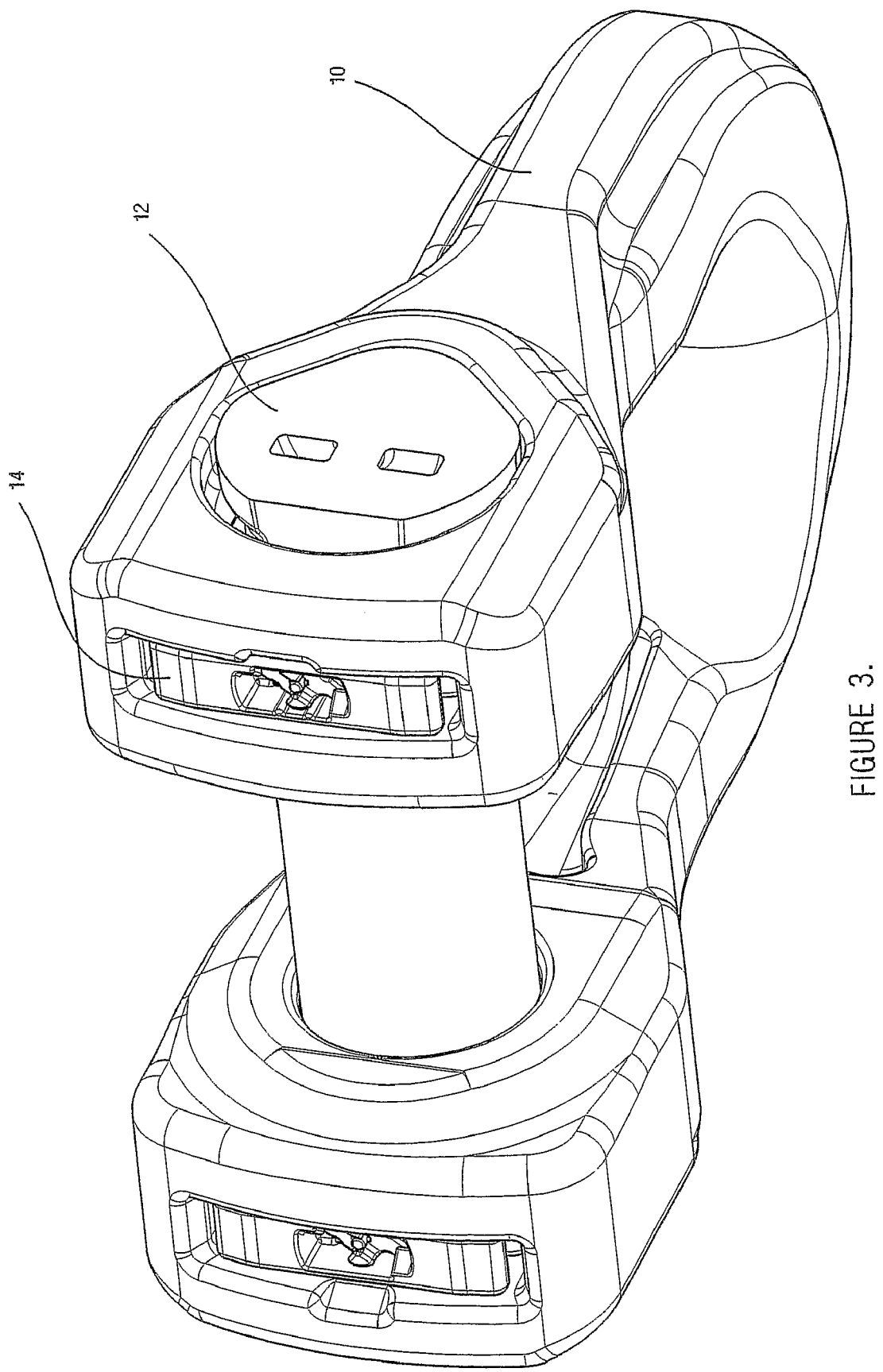
FIG. 3 is a view of the unit of FIG. 1 when assembled.

FIG. 3 shows an assembled shackle which securely retains the shackle pin yet the arrangement is such that despite operative service in demanding conditions e.g. on a drag line chain system, without impact tools or cutting tools, simple extraction of each retainer latch releases the shackle pin for removal and replacement as may be required.

Referring now to FIGS. 4 to 8, the retainer latch 14 will now be described in more detail. The retainer 14 includes a body 38. A latch element in the form of tongue 40 includes projecting pivot pins 42 which mount in recesses 44 in the body and are held in place by cover plates (not shown) which are subsequently welded to the body to fit in rectangular recesses 46. Retainer 14 includes a latch actuator in the form of plug 16. In FIGS. 4 to 8 a plug is shown inserted in retainer 14. In the inserted position end portion 48 of plug 16 displaces tongue 40 to rotate it to a latching position as shown in FIGS. 4 to 8.

Referring now to FIGS. 26 to 38, construction of the plug 16 is shown in more detail. The end portion 48 of plug 16 includes a rectangular shaped extension 50 upon which a retention means in the form of spider 52 is rotatably mounted upon shaft 54 and held in place by pin 56 which is an interference fit in aperture 58 in shaft 54. Spring 60 biases spider 52 towards an engaged position as shown in FIGS. 26 to 31.

Referring again to FIGS. 1, 2 and 3, assembly of the shackle is carried out by firstly inserting shackle pin 12 inside bores 23 of body 18. When pin 12 is in position a retainer 14 is inserted into each of apertures 30 to engage with neck portions 34 on shackle pin 12. When each retainer 14 is in position then plugs 16 are pushed into apertures 62 provided on each retainer. Insertion of plug 16 causes rotation of tongue 40 to the latched position. In the latched position any attempt to withdraw retainer 14 causes tongue 40 to engage latching shoulder 64. As plug 16 is inserted into aperture 62 of retainer 14, wings 66 of spider engage with ramps 68 of retainer 14 to rotate spider 52 against the force of spring 60. When plug 16 has been pushed into aperture 62 the required distance, wings 66 snap behind latch shoulders 70, being located at the undersides of ramps 68, to hold plug 16 in the retainer, as can be seen in FIG. 7.

Figure 9:
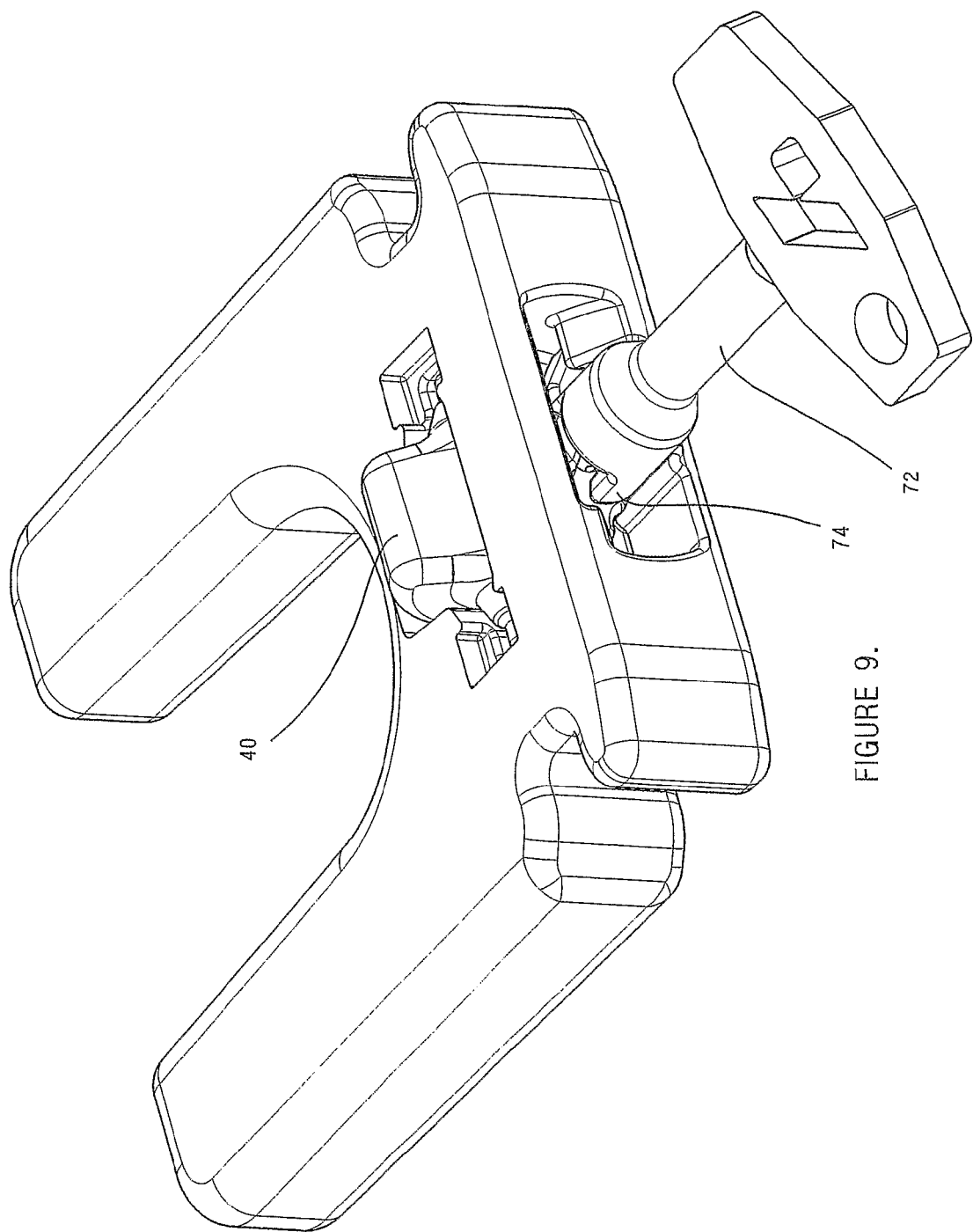
FIG. 9 is a perspective view illustrating use of a lock release foot on the locking unit.
Figure 16:
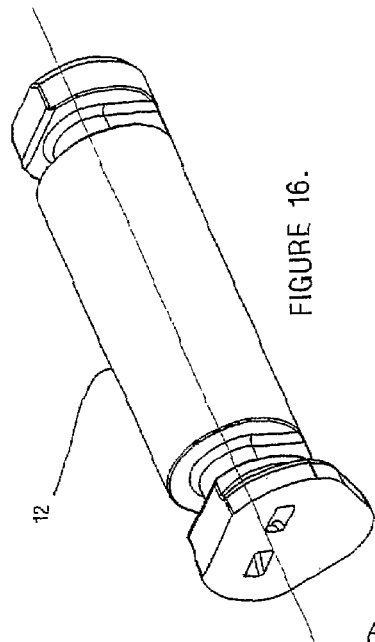
FIG. 16 is a perspective view of the shackle pin used in FIG. 1.
Figure 19:
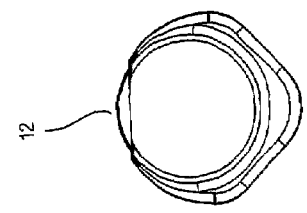
FIG. 19 is a right hand end view of the shackle pin of FIG. 16.
Figure 17:
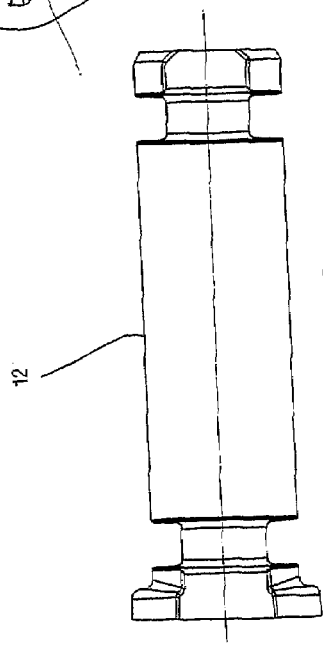
FIG. 17 is a plan view of the shackle pin of FIG. 16.
Figure 18:
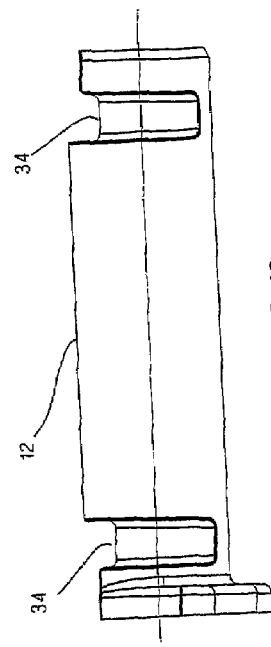
FIG. 18 is a front view of the shackle pin of FIG. 16.
Figure 20:
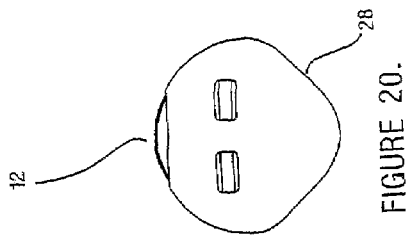
FIG. 20 is a left hand end view of the shackle pin of FIG. 16.
Figure 36:
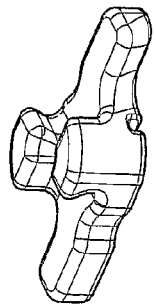
FIG. 36 is a perspective view from above of the retainer of FIG. 32.
Figure 32:
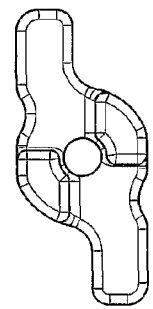
FIG. 32 is a plan view of the retainer for the device of FIG. 27.
Figure 35:
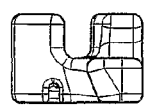
FIG. 35 is an end view of the retainer of FIG. 32.
Figure 37:
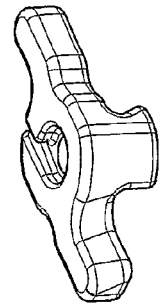
FIG. 37 is a corresponding perspective view from below of the retainer.
Figure 33:
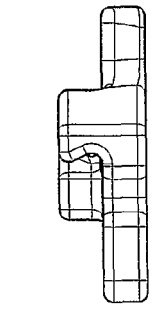
FIG. 33 is a side elevation of the retainer of FIG. 32.
Figure 38:
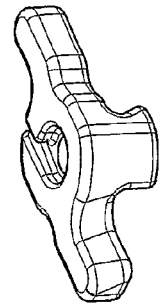
FIG. 38 is a further perspective view from below of the retainer.
Figure 34:
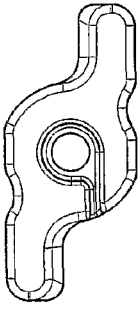
FIG. 34 is a bottom view of the retainer of FIG. 32.
Figure 42:
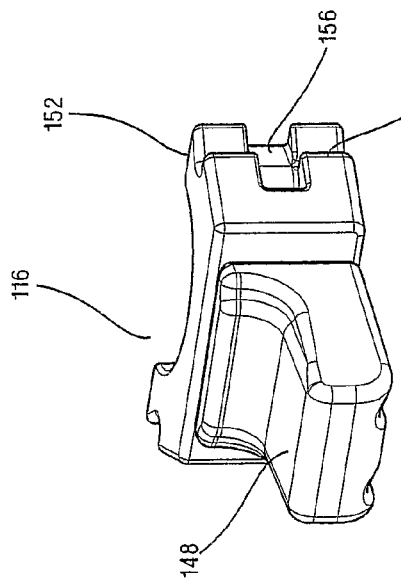
FIG. 42 is a perspective view of the latch actuator of FIG. 39.
Figure 43:
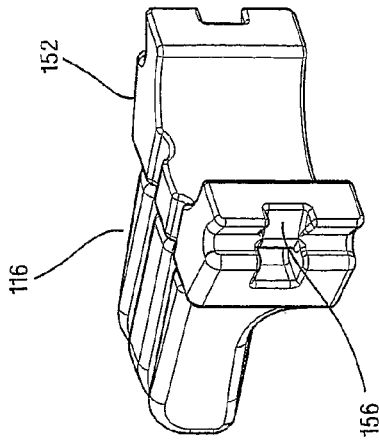
FIG. 43 is a rear perspective view of the latch actuator of FIG. 39.
Figure 39:
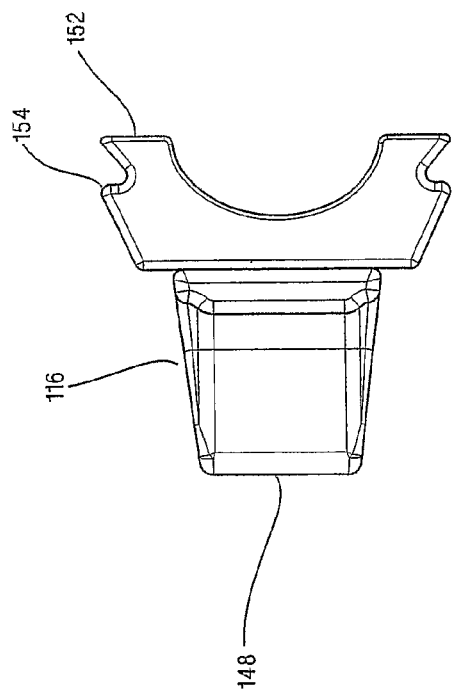
FIG. 39 is a plan view of an alternative latch actuator.
Figure 40:
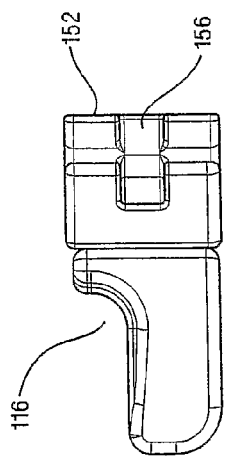
FIG. 40 is a side view of the latch actuator of FIG. 39.
Figure 41:
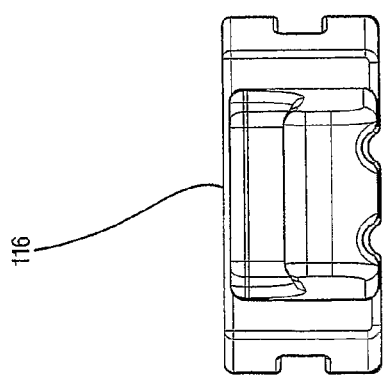
FIG. 41 is an end view of the latch actuator of FIG. 39.

Removal of plug 16 is effected by a removal tool 72 as depicted in FIG. 9. Lugs 74 of the removal tool are engageable with spider 52 to rotate spider against spring pressure of spring 60 to release wings 66 of spider 52 from behind the latching shoulders 70. Tool 72 is then pulled to extract plug 16 from aperture 62. With plug 16 extracted, tongue 40 is free to rotate away from latching shoulder 64 thus allowing removal of retainer 14 and thus subsequent removal of shackle pin 12.

Referring to FIGS. 21 to 25, an alternative version of shackle pin is shown denoted by reference numeral 112. This version of shackle pin differs from the first described embodiment in that the pin is free to rotate once installed in the shackle. Specifically, the head of the pin 128 is circular and the recesses 134 provided towards the ends of the pin extend for the entire circumference of the pin.

Referring to FIGS. 39 to 43 an alternative plug is shown denoted by reference numeral 116. In this version end portion 148 is formed from metal and is rigidly affixed to plug carrier 152. Plug carrier 152 is formed from polyurethane or rubber. With this version of plug, when plug 116 is inserted into the retainer it is held in place by a snap fit of shoulders 154 into corresponding latching shoulders provided in the aperture of a corresponding retainer (not shown). Removal of plug 116 is effected by inserting the blade of a flat head screwdriver or the like into recess 156 to prise plug 16 from retainer 14.

Referring to FIGS. 44 to 48, a further alternative plug 216 is shown. In this version the majority of the plug including end 248 is formed from high density plastic. An insert 250 formed from low density plastic is provided in the plug. Plug 216 is inserted into the retainer in a similar manner as to the plug 116. When inserted a sufficient distance, plugs 254 engage with corresponding latching shoulders provided in the aperture of a corresponding retainer (not shown). Removal of plug 216 is effected by inserting the blade of a flathead screwdriver or the like into recess 256 to prise plug 216 free from the retainer thus allowing rotation of tongue 40 as described above.

It is to be noted that, when assembled, there is a clearance of approximately 25 mm between recess 34 and the insides of retainer legs 32. This allows up to 25 mm of wear in the bore of the shackle until any load is applied to the retainer by the shackle pin.

Unless otherwise indicated, all parts of the shackle assembly are formed from 12C cast alloy steel available from Esco Corporation.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A retainer for retaining an elongate, load-carrying pin in a structure, the pin being adapted to be axially moved into a receiving cavity in the structure, the retainer having
   (a) a body;
   (b) the body having at least one projecting element;
   (c) the at least one projecting element adapted such that in use at least a portion of the retainer abuts a surface portion of the elongate pin such that the elongate pin is inhibited from axial movements within the receiving cavity;
   (d) the body further comprising a latch element;
   (e) the latch element adapted to retain the retainer with respect to the structure, wherein the latch element has an engaged and a retracted position;
   (f) wherein the latch element in the engaged position extends outwardly of the body of the retainer to engage the structure and retain the retainer with respect to the structure;
   (g) a latch actuator displaceable in the body from a released position to a locking position to engage the latch element and move the latch element from the retracted position into the engaged position; and
   (h) the latch actuator further having releasable retention means for retaining the latch actuator in the locking position; and
   (i) the body further comprising a latch shoulder;
   (j) wherein the retention means releasably engages behind the latch shoulder arrangement for retaining the latch actuator in the locking position.

2. A retainer as claimed in claim 1, wherein the latch element is pivotal in the body of the retainer.

3. A retainer as claimed in claim 2, wherein the latch element is a part-cylindrical, wedge-shaped form with projecting pivot pins and the latch actuator has a complementary shaped end portion for engaging and retracting pivotally the wedge-shaped latch element to its engaged position.

4. A retainer as claimed in claim 3, wherein the end portion of the latch actuator includes a rectangular shaped extension from a base portion which rotatably mounts the retention means which is rotationally spring-biased towards the locked position which is releasably engaged behind the latch shoulder arrangement for retaining the latch actuator in the locked position; and by rotary displacement against the spring biasing the retention means can be displaced from the latching shoulder arrangement to permit retraction of the latch actuator thereby allowing the wedge-shaped latch element to pivot out of engagement whereby the retainer may be removed from the aperture.

5. A retainer as claimed in claim 4, wherein the retention means has wings extending to either side and adapted to engaged with respective latching shoulders within the latch shoulder arrangement, the surfaces having complementary ramps so that the retainer may be positioned in the aperture of the structure and the latch actuator pushed inwardly wherein the ramps engaged to rotate the retention means against the spring-biasing before snapping behind the latch shoulder arrangements while the latch element is pushed into the space in the engaged position for retaining purposes.

6. A retainer as claimed in claim 1, wherein the elongate pin has a reduced diameter portion, and the projecting element is in the form of two legs forming a fork extension from the body for engaging around the reduced diameter portion of the elongate pin.

7. An apparatus comprising a structure, a load-carrying pin and a retainer for retaining an elongate, load-carrying pin in the structure, the pin being adapted to be axially moved into a receiving cavity in the structure, the structure having a transversely directed aperture interconnecting with a receiving cavity and having a latching portion, the pin having a surface element in relation to which the retainer, when inserted into the transverse aperture, is positioned to restrain axial movement of the pin in a removal direction from the cavity, the retainer comprising
   (a) a body
   (b) the body having at least one projecting element;
   (c) the at least one projecting element adapted such that in use at least a portion of the retainer abuts a surface portion of the elongate pin such that the elongate pin is inhibited from axial movements within the receiving cavity;
   (d) the body further comprising a latch element;
   (e) the latch element adapted to retain the retainer with respect to the structure wherein the latch element has an engaged and a retracted position wherein the latch element in the engaged position extends outwardly of the body of the retainer to engage the structure and retain the retainer with respect to the structure,
   (f) a latch actuator displaceable in the body from a released position to a locking position to engage the latch element and move the latch element from the retracted position into the engaged position; and
   (g) the latch actuator further having releasable retention means for retaining the latch actuator in the locking position; and the body further comprising a latch shoulder;
   (h) wherein the retention means releasably engages behind the latch shoulder arrangement for retaining the latch actuator in the locking position.

8. Apparatus as claimed in claim 7 wherein the structure is in the form of a shackle having two spaced loops with respective aligned apertures through which the pin is adapted to fit.

9. A structure in the form of a load carrying connecting element having a receiving cavity and a latching portion, and a transversely directed aperture interconnecting with the cavity and configured such that an elongate, load-carrying pin is adapted to be axially moved into the receiving cavity within the structure, and the structure is configured to allow a retainer to be inserted into the aperture to restrain axial movement of the pin in a removal direction, the retainer comprising;
   (a) a body
   (b) the body having at least one projecting element;
   (c) the at least one projecting element adapted such that in use at least a portion of the retainer abuts a surface portion of the elongate pin such that the elongate pin is inhibited from axial movements within the receiving cavity;
   (d) the body further comprising a latch element;
   (e) the latch element adapted to retain the retainer with respect to the structure wherein the latch element has an engaged and a retracted position wherein the latch element in the engaged position extends outwardly of the body of the retainer to engage the structure and retain the retainer with respect to the structure, (f) a latch actuator displaceable in the body from a released position to a locking position to engage the latch element and move the latch element from the retracted position into the engaged position; and (g) the latch actuator further having releasable retention means for retaining the latch actuator in the locking position; and the body further comprising a latch shoulder;

(h) wherein the retention means releasably engages behind the latch shoulder arrangement for retaining the latch actuator in the locking position.

10. A structure as claimed in claim 9, wherein the structure is in the form of a shackle having two spaced loops with respective aligned cavities adapted to receive the elongate pin.

11. A structure as claimed in claim 10, wherein at least one of the cavities has an associated rebate in the external face of a leg for accommodating a complementary non-circular head of the pin whereby it can be retained non-rotationally.

12. A structure as claimed in claim 10, wherein the shackle is substantially symmetrical and has transverse apertures for receiving a retainer, whereby either or both of the apertures may receive a retainer.

13. An elongate load carrying pin for mounting in a structure and adapted to be secured by a retainer, the pin being adapted to be axially moved into a receiving cavity in the structure, the structure having a transversely directed aperture interconnecting with the receiving cavity and having a latching portion, the retainer comprising:

(a) a body (b) the body having at least one projecting element;

(c) the at least one projecting element adapted such that in use at least a portion of the retainer abuts a surface portion of the elongate pin such that the elongate pin is inhibited from axial movements within the receiving cavity;

(d) the body further comprising a latch element;

(e) the latch element adapted to retain the retainer with respect to the structure wherein the latch element has an engaged and a retracted position wherein the latch element in the engaged position extends outwardly of the body of the retainer to engage the structure and retain the retainer with respect to the structure, (f) a latch actuator displaceable in the body from a released position to a locking position to engage the latch element and move the latch element from the retracted position into the engaged position; and (g) the latch actuator further having releasable retention means for retaining the latch actuator in the locking position; and the body further comprising a latch shoulder;

(h) wherein the retention means releasably engages behind the latch shoulder arrangement for retaining the latch actuator in the locking position.

14. An elongate pin as claimed in claim 13, wherein the elongate pin has a non-circular head adapted to be accommodated in a complentary cavity in the structure to prevent rotation of the pin.

\* \* \* \* \*

UNITED STATES PATENT AND TRADEMARK OFFICE
CERTIFICATE OF CORRECTION

PATENT NO. : 8,104,988 B2
APPLICATION NO. : 12/302761
DATED : January 31, 2012
INVENTOR(S) : Jason Lunn, Matthew Patton and Reece Attwood Page 1 of 1

It is certified that error appears in the above-identified patent and that said Letters Patent is hereby corrected as shown below:

IN THE CLAIMS:

Col. 8, line 30, claim 14, please delete "complentary" and insert --complementary--.

Signed and Sealed this
Thirteenth Day of March, 2012

David J. Kappos
*Director of the United States Patent and Trademark Office*